Nov. 18, 1924.  1,516,188

C. W. HAWTHORNE

MACHINE FOR UNITING THE ENDS OF WIRES

Filed Oct. 20 1923

Inventor:
Charles W. Hawthorne
By attorneys
Southgate & Southgate

Patented Nov. 18, 1924.

1,516,188

UNITED STATES PATENT OFFICE.

CHARLES W. HAWTHORNE, OF SHREWSBURY, MASSACHUSETTS, ASSIGNOR TO WICKWIRE SPENCER STEEL CORPORATION, OF NEW YORK, N. Y., A CORPORATION OF MASSACHUSETTS.

MACHINE FOR UNITING THE ENDS OF WIRES.

Application filed October 20, 1923. Serial No. 669,837.

*To all whom it may concern:*

Be it known that I, CHARLES W. HAWTHORNE, a citizen of the United States, residing at Shrewsbury, in the county of Worcester and State of Massachusetts, have invented a new and useful Machine for Uniting the Ends of Wires, of which the following is a specification.

This invention relates to a machine for uniting the ends of wires, an operation frequently necessary in many manufacturing processes in which long continuous lengths of wire are required. Machines for this purpose have been heretofore devised in which it was necessary for the operator to use one hand for operating the machine while with his other hand he endeavored to keep the two wire ends in position for twisting together. This was a difficult and very inconvenient procedure and frequently resulted in imperfect splices or broken wires.

It is the object of my invention to provide a machine of simple and reliable construction in which both hands of the operator may be used to hold the wires during the operation of the machine and in which better splices may be more quickly made. For the accomplishment of these objects I provide a wire holder rotatably mounted in a movable support, together with means for rotating the holder by movement of the support.

My invention further relates to arrangements and combinations of parts which will be hereinafter described and more particularly pointed out in the appended claims.

Two forms of my invention are shown in the drawings, in which

Fig. 1 is a side elevation illustrating one embodiment of my invention;

Fig. 2 is a sectional plan view taken along the line 2—2 in Fig. 1;

Fig. 3 shows a form of splice or twist produced by my improved machine;

Fig. 4 is a perspective view showing a modified form of the invention; and

Fig. 5 is a detail sectional view of the wire holder.

Referring to Figs. 1 and 2 I have shown my improved splicing machine as comprising a plate or disc 10 adapted to be secured to a fixed supporting surface 11 by screws 12 passing through flanges 13 on the lower edge of the disc 10. A wire holder in the form of a cylinder 15 is rotatably mounted in bearings in a support 16 pivoted at 17 to the center of the disc 10. The holder 15 is provided with gear teeth 18 about its periphery meshing with corresponding teeth 19 forming a circular rack around the edge of the disc 10. At one point in its circumference the holder 15 is provided with a longitudinal slot 20 extending slightly beyond the axis of the holder and having its width somewhat greater than the diameter of the wires to be twisted. At the center of the length of said slot 20, a pin $20^a$ (Fig. 5) is placed radially in the holder 15 and is provided with a slot approximately equal to the diameter of the wires to be twisted.

Stop pins 21 and 22 limit movement of the support 16 in both directions and at each end of its path of movement the slot 20 in the holder 15 will be aligned with a guide opening 23 (Fig. 1) in the end of the support 16.

It is then possible for the operator to oppositely insert the ends of the wires to be united, placing them approximately at the axis of the holder 15. While holding the wires in this position the operator can also apply pressure to the projection 24 of the support 16, thus moving the support about its pivot and rotating the wire holder to produce the twist or splice indicated in Fig. 3, the twist or splice forming at both sides of the narrow slot in the pin $20^a$. After the wire has been removed, the short ends may be cut off and a neat and accurate splice results.

It is desirable to release the wires at the sides of the support 16 after the twisting operation and for this purpose I provide adjustable clamping plates 25 and 26. The plates 25 are adjustable on the projection 24 and the plates 26 are similarly adjustable upon a clamping member 27 pivoted at $28^a$ to the support 16. The clamping member 27 is preferably forked at its free end and is provided with a contact surface 28 engaging the edge of the disc 10.

When at its extreme right hand or finishing position, as indicated in Fig. 1, the contact portion 28 is received in a recess 29 in the edge of the disc 10, thus permitting slight separation of the clamping plates 25 and 26 and easy removal of the twisted wires therefrom. As the support 24 is returned to initial position, the surface 28 of the clamping member is drawn out of the recess 29, and the edge of the disc 10 acts as a cam to swing the support outwardly and cause the plates 25 and 26 to resume their operative relation.

In Fig. 4 I have shown a slightly different embodiment of my invention in which the wire holder is rotatably mounted in a block 30 and provided with studs or screws 31, the inner ends of which project into a longitudinal groove or recess 32 in the side of a straight rack bar 33. As shown in the drawing, this rack bar may be formed as the web or middle portion of a T-shaped metal rod or bar 34. A cross plate 35 is fixed to the block 31 and stop pins 36 and 37 limit movement of the block in both directions.

The operation of this device is substantially similar to that already described, the wire holder and supporting block being moved along the relatively fixed rack and being simultaneously rotated by such movement. This form of the device may be secured to a table or any other fixed object, as with the previous form, or if of small size and light construction it may be secured to the leg of the operator by straps 38 and may be supported by a strap 39. The machine is then always available as the operator moves about to different parts of the machine to make his splices.

The great advantage of my machine over such splicing machines as are familiar to me, lies in the fact that the operator can move the block or support while retaining firm hold of both of the wires to be twisted and that by such movement of the support the holder can be simultaneously rotated and the wires quickly joined.

Having thus described my invention and the advantages thereof, I do not wish to be limited to the details herein disclosed otherwise than as set forth in the claims, but what I claim is:—

1. A machine for uniting the ends of wire which comprises a wire holder, a movable support in which said holder is rotatably mounted, and means to rotate said holder by movement of said support.

2. A machine for uniting the ends of wire which comprises a wire holder, a movable support in which said holder is rotatably mounted, said holder being bodily movable with said support, and means to simultaneously rotate said holder during such movement.

3. A machine for uniting the ends of wire which comprises a wire holder having gear teeth about its periphery, a fixed actuating member having gear teeth meshing with the teeth of said wire holder, and a support in which said holder is rotatably mounted, said support being also movable relative to said fixed actuating member.

4. A machine for uniting the ends of wire which comprises a wire holder having gear teeth about its periphery, a fixed rack plate with which said teeth engage, and a manually movable support for said holder by which said holder may be moved bodily along said rack and will be simultaneously rotated about its own axis.

5. A machine for uniting the ends of wire which comprises a wire holder having gear teeth about its periphery, a segmental disc fixed in position and having gear teeth meshing with the teeth on said wire holder, and a support in which said holder is rotatably mounted, said support being pivoted at the axis of said disc.

6. A machine for uniting the ends of wire which comprises a wire holder, a movable support in which said holder is rotatably mounted, said holder being bodily movable with said support, means to simultaneously rotate said holder in said support, clamping devices for the wires on said support, and means to move said clamping devices to holding position on movement of said support from wire receiving position.

7. A machine for uniting the ends of wire which comprises a wire holder, a movable support in which said holder is rotatably mounted, means to rotate said holder by movement of said support, and means to release the twisted wires in said support as the splice is completed.

8. A machine for uniting the ends of wire which comprises a wire holder having gear teeth about its periphery, a segmental disc fixed in position and having gear teeth meshing with the teeth on said wire holder, a support in which said holder is rotatably mounted, said support being pivoted at the axis of said disc, and a clamping device pivotally mounted on said support and having a portion received in a recess in the edge of said disc when the parts are in splice-finishing position, whereby said clamping device is withdrawn to release the twisted wires from the machine.

In testimony whereof I have hereunto affixed my signature.

CHARLES W. HAWTHORNE.